US010638206B1

(12) United States Patent
 Cannon et al.

(10) Patent No.: US 10,638,206 B1
(45) Date of Patent: Apr. 28, 2020

(54) VIDEO ANNOTATION BASED ON SOCIAL MEDIA TRENDS

(71) Applicant: International Business Machines Corporation, Armonk, NY (US)

(72) Inventors: Gray Cannon, Miami, FL (US); Marco Aurelio Stelmar Netto, Sao Paulo (BR); Vagner Figueredo De Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/258,752

(22) Filed: Jan. 28, 2019

(51) Int. Cl.
*H04N 9/80* (2006.01)
*H04N 21/8549* (2011.01)
*G06K 9/00* (2006.01)
*G06Q 50/02* (2012.01)
*G06F 16/435* (2019.01)
*H04L 29/08* (2006.01)
*G06F 17/24* (2006.01)
*G06F 16/783* (2019.01)

(52) U.S. Cl.
CPC ....... *H04N 21/8549* (2013.01); *G06F 16/435* (2019.01); *G06F 16/7837* (2019.01); *G06F 17/241* (2013.01); *G06K 9/00751* (2013.01); *G06Q 50/02* (2013.01); *H04L 67/22* (2013.01)

(58) Field of Classification Search
CPC H04N 21/8549; G06Q 50/02; G06F 16/7837; G06F 17/241; G06F 16/435; H04L 67/22; G06K 9/00751
USPC ........................................................ 386/248
See application file for complete search history.

(56) References Cited

U.S. PATENT DOCUMENTS

| 7,234,117 | B2 | 6/2007 | Zaner |
| 7,613,690 | B2 | 11/2009 | Chowdhury |
| 7,769,819 | B2 | 8/2010 | Lerman |
| 8,543,454 | B2 | 9/2013 | Fleischman |

(Continued)

FOREIGN PATENT DOCUMENTS

WO 2014189891 A1 11/2014

OTHER PUBLICATIONS

Ballan et al., "Social Media Annotation", 11th International Workshop on Content-Based Multimedia Indexing (CBMI), Jun. 17-19, 2013, VESZPR'EM, Hungary, ©2013 IEEE, pp. 229-235.

(Continued)

*Primary Examiner* — Helen Shibru
(74) *Attorney, Agent, or Firm* — Isaac J. Gooshaw

(57) ABSTRACT

A customized video stream is provided. A second content is searched for that includes the plurality of entities, and a plurality of user data associated with the social media account. A hierarchy of additional content is generated based, at least in part, on the second content that is associated with the plurality of entities, and the user data associated with the social media account, wherein the hierarchy of additional content contains a plurality of second content. A customized video stream is generated based, at least in part, on the video stream and the hierarchy of additional content. The customized video stream is populated on a display screen of the user device, wherein the video stream is displayed on the display screen of the user device, and the hierarchy of additional content is displayed in a portion of the display screen and displayed concurrently with the video stream.

20 Claims, 4 Drawing Sheets

(56) References Cited

U.S. PATENT DOCUMENTS

| | | | |
|---|---|---|---|
| 9,031,845 B2* | 5/2015 | Kennewick | G06F 16/3329 704/270 |
| 9,092,829 B2 | 7/2015 | Fleischman | |
| 9,110,929 B2* | 8/2015 | Garcia | H04N 21/458 |
| 9,218,101 B2 | 12/2015 | Fleischman | |
| 9,411,855 B2* | 8/2016 | Kemp | G06F 16/24565 |
| 9,443,147 B2 | 9/2016 | Mei | |
| 9,697,504 B2* | 7/2017 | Spitz | G06Q 30/0277 |
| 2007/0250901 A1 | 10/2007 | McIntire | |
| 2010/0169906 A1 | 7/2010 | Takahashi | |
| 2012/0036264 A1 | 2/2012 | Jiang | |
| 2012/0054813 A1 | 3/2012 | Carmichael | |
| 2012/0060094 A1 | 3/2012 | Irwin | |
| 2012/0227077 A1 | 9/2012 | Spivack | |
| 2013/0091217 A1 | 4/2013 | Schneider | |
| 2013/0132861 A1 | 5/2013 | Kienzle | |
| 2013/0332834 A1 | 12/2013 | Li | |
| 2014/0157306 A1 | 6/2014 | Deo | |
| 2014/0223475 A1 | 8/2014 | McIntire | |
| 2014/0335502 A1 | 11/2014 | Huang | |
| 2015/0026600 A1 | 1/2015 | Dunn | |
| 2015/0032876 A1 | 1/2015 | Staunton-Lambert | |
| 2016/0105489 A1* | 4/2016 | Llorca | G06F 9/5077 709/226 |
| 2016/0205428 A1* | 7/2016 | McDonough | H04N 21/23424 725/31 |
| 2018/0234738 A1* | 8/2018 | Sarkar | H04N 21/2187 |
| 2019/0034985 A1* | 1/2019 | Randall | G06Q 30/0282 |
| 2019/0089996 A1* | 3/2019 | Surcouf | H04N 21/2187 |

OTHER PUBLICATIONS

Guimaraes et al., "Creating and Sharing Personalized Time-Based Annotations of Videos on the Web", DocEng2010, Sep. 21-24, 2010, Manchester, United Kingdom, Copyright 2010 ACM, pp. 27-36.

* cited by examiner

VIDEO ANNOTATION BASED ON SOCIAL MEDIA TRENDS

BACKGROUND OF THE INVENTION

The present invention relates generally to the field of streaming intelligence, and more particularly to embedding content in a video file.

In recent years, the growth of social media has produced opportunities for innovation in the features associated with social media. Social media content is compelling to users because the content is highly personalized, as the feed of a social media user is populated with items that relate to interests and personalities selected by the user. Additionally, the content in social media channels is immediate, with users consuming content mere seconds after it is created. Furthermore, streaming intelligence has grown to produce features that connect users with various extraneous information, that often coincides with content provided through a streaming service.

SUMMARY

Embodiments of the present invention provide a method to generate a customized video stream utilizing user data from a social media account.

A first embodiment encompasses a method for a customized video stream system. One or more processors determine a first content is selected on a user device. The one or more processors populate a video stream on the user device based, at least in part, on a selection of the first content. The one or more processors analyze (i) at least one video stream that includes a set of entities and (ii) a social media account associated with a user of the user device. The one or more processors identify (i) a plurality of entities associated with the, at least, one video stream and (ii) a plurality of user data associated with the social media account. The one or more processors search for a second content that includes based, at least in part, on (i) the plurality of entities associated with the, at least, one video stream and (ii) a plurality of user data associated with the social media account. The one or more processors generate a hierarchy of additional content based, at least in part, on the second content that is associated with (i) the plurality of entities and (ii) the user data associated with the social media account, wherein the hierarchy of additional content contains a plurality of second content. The one or more processors generate a customized video stream based, at least in part, on (i) the video stream and (ii) the hierarchy of additional content. The one or more processors populate the customized video stream on a display screen of the user device.

A second embodiment encompasses a computer program product for a customized video stream system. The computer program product includes one or more computer-readable storage media and program instructions on the one or more computer-readable storage media. The program instructions include program instructions to determine a first content is selected on a user device. The program instructions include instructions to populate a video stream on the user device based, at least in part, on a selection of the first content. The program instructions include instructions to analyze (i) at least one video stream that includes a set of entities and (ii) a social media account associated with a user of the user device. The program instructions include instructions to identify (i) a plurality of entities associated with the, at least, one video stream and (ii) a plurality of user data associated with the social media account. The program instructions include instructions to search for a second content that includes based, at least in part, on (i) the plurality of entities associated with the, at least, one video stream and (ii) a plurality of user data associated with the social media account. The program instructions include instructions to generate a hierarchy of additional content based, at least in part, on the second content that is associated with (i) the plurality of entities and (ii) the user data associated with the social media account, wherein the hierarchy of additional content contains a plurality of second content. The program instructions include instructions to generate a customized video stream based, at least in part on (i) the video stream and (ii) the hierarchy of additional content. The program instructions include instructions to populate the customized video stream on a display screen of the user device, wherein the video stream is displayed on the display screen of the user device, and the hierarchy of additional content is displayed in a portion of the display screen and displayed concurrently with the video stream.

A third embodiment encompasses a computer system for a customized video stream system. The computer system includes one or more computer processors, one or more computer readable storage medium, and program instructions stored on the computer readable storage medium for execution by at least one of the one or more processors. The program instructions include program instructions to determine a first content is selected on a user device. The program instructions include instructions to populate a video stream on the user device based, at least in part, on a selection of the first content. The program instructions include instructions to analyze (i) at least one video stream that includes a set of entities and (ii) a social media account associated with a user of the user device. The program instructions include instructions to identify (i) a plurality of entities associated with the, at least, one video stream and (ii) a plurality of user data associated with the social media account. The program instructions include instructions to search for a second content that includes based, at least in part, on (i) the plurality of entities associated with the, at least, one video stream and (ii) a plurality of user data associated with the social media account. The program instructions include instructions to generate a hierarchy of additional content based, at least in part, on the second content that is associated with (i) the plurality of entities and (ii) the user data associated with the social media account, wherein the hierarchy of additional content contains a plurality of second content. The program instructions include instructions to generate a customized video stream based, at least in part on (i) the video stream and (ii) the hierarchy of additional content. The program instructions include instructions to populate the customized video stream on a display screen of the user device, wherein the video stream is displayed on the display screen of the user device, and the hierarchy of additional content is displayed in a portion of the display screen and displayed concurrently with the video stream.

DETAILED DESCRIPTION

Figure 1:
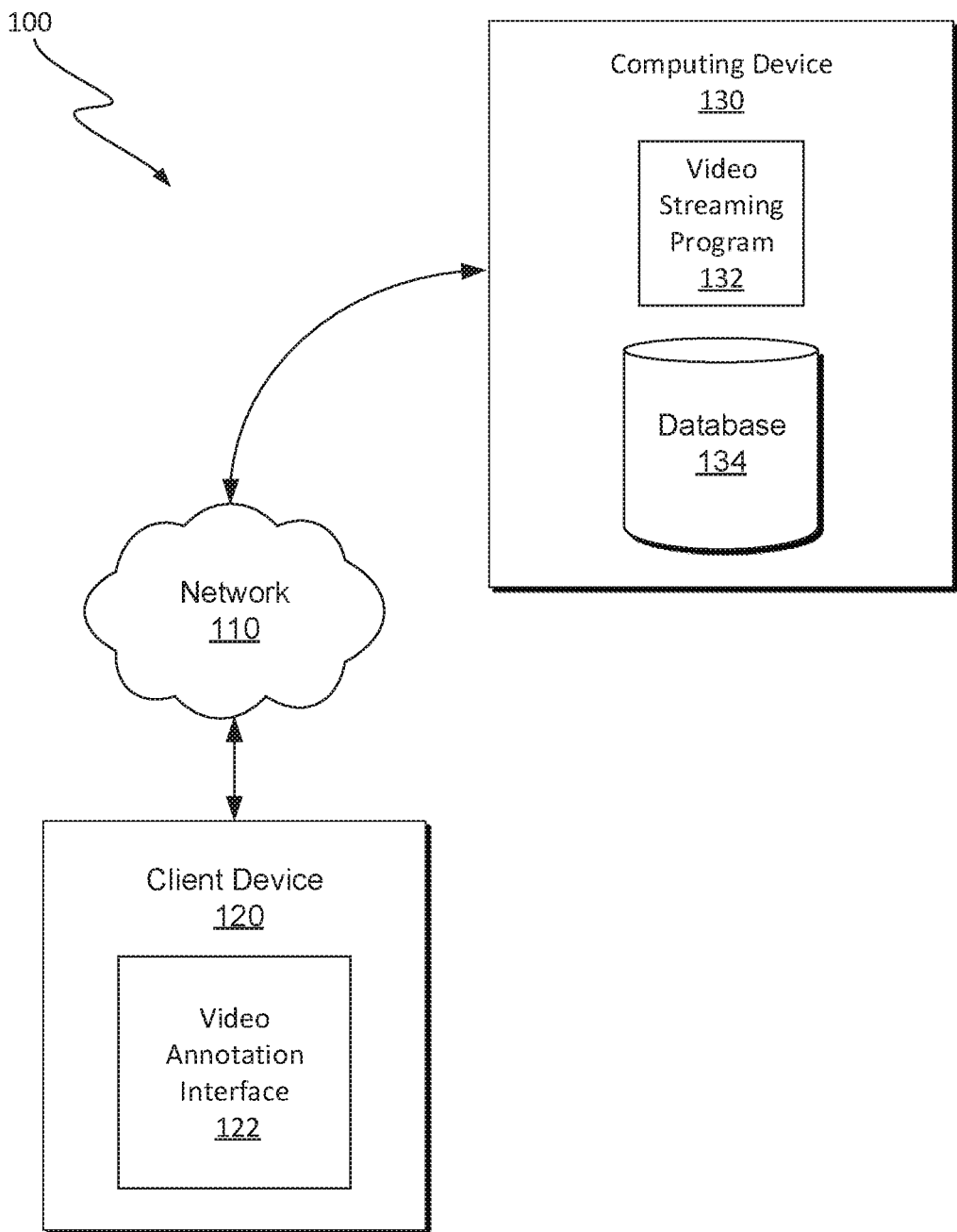
FIG. 1 is a functional block diagram illustrating a computing environment, in which a streaming intelligence system generates a hierarchy of additional content and embeds a video stream, accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In some solutions to streaming intelligence, an annotation input can be received that is associated with a displayed segment of the recorded video content. This annotation input is embedded within the annotation data of the recorded data. However, embodiments of the present invention recognize that such solutions can be improved by proactively analyzing metadata from a live stream video and identifying data from a social media account associated with a user of a computing device. Accordingly, embodiments of the present invention provide for integrating metadata from a live stream video and data identified from a social media account to generate a hierarchy of additional content that is displayed in a live video stream. Furthermore, embodiments of the present invention provide for displaying the hierarchy of additional content on a computing device that allows for a user of computing device to interact and select additional content to be displayed on the display screen of the computing device. Although, content from social media can be obtained from various computing devices, a user does not have access to content from a social media related to a video file displayed on the same computing device. The transition of a user from a first computing device to a second computing device is often out of reach of streaming and social media creators and prevent a user from enjoying each the social media content and the video file simultaneously. In contrast, generating additional content displayed in a video stream allows user preferences to consume the video stream, as well as content from social media.

Embodiments of the present invention further recognize that streaming intelligence involves a set of policies, tools and procedures to enable annotations to be displayed in a live video stream. Some solutions to video annotation of live video streams display sections of a live video stream or display one or more live video streams that can be shared with other users of a computing device. However, such systems may, in certain circumstances, be ineffective to provide content to users of a computing device compared to other solutions. Accordingly, embodiments of the present invention provide for a more effective system for displaying live video streams, as well as additional content based, at least in part, on interests and/or trend patterns of a user social media account on a single computing device. Furthermore, the present invention provides for a more effective system for producing a list of additional content based, at least in part, on the data gather from a user's social media account. Additionally, the present invention provides a more effective transition of annotating a video stream by overlaying the current video stream with a hierarchy of additional content that is displayed to the user of a computing device.

The present invention will now be described in detail with reference to the Figures.

FIG. 1 is a functional block diagram illustrating computing environment, generally designated 100, in accordance with one embodiment of the present invention. Computing environment 100 includes client device 120 and computing device 130 connected over network 110. Client device 120 includes video annotation interface 122. Computing device 130 includes video streaming program 132 and database 134. Video annotation interface 122 and video streaming program 132 include program instructions to perform the functions of the invention as described herein.

In various embodiments of the present invention, client device 120 is a computing device that can be a standalone device, a server, a laptop computer, a tablet computer, a netbook computer, a personal computer (PC), a personal digital assistant (PDA), a smartphone, a smartwatch, smart glasses, a desktop computer, or any programmable electronic device or combination of programmable electronic devices capable of executing machine readable program instructions and communicating with computing device 130, and other computing devices (not shown) within computing environment 100 via a network, such as network 110. In another embodiment, client device 120 represents a computing system utilizing clustered computers and components to act as a single pool of seamless resources. In general, client device 120 can be any computing device or a combination of devices with access to computing device 130 and network 110 and is capable of executing video annotation interface 122. Client device 120 may include internal and external hardware components, as depicted and described in further detail with respect to FIG. 1.

In some embodiments, video annotation interface 122 operates to populate the screen of client device 120 with a video stream, an annotation list, webpage, and/or login information requiring personal identifying information (i.e., username, password and/or PIN). The present invention recognizes that one of ordinary skill in the art will understand that a graphic user interface (GUI) interface can populate the screen of a computing device with images, text, and various other digital pictures. Accordingly, video annotation interface 122 operates to receive video streams, annotation lists, and/or webpages to input various user preferences to populate on client device 120. In addition to the features recognized above, video annotation interface 122 can transmit a request to video streaming program 132 to review video. In response to receiving the request, video streaming program 132 generates a social media login based, at least in part on identifying information associated with a user of client device 120. Video streaming program 132 transmits the social media login to client device 120, where client device 120 utilizes video annotation interface 122 to populate the social media login, and video annotation interface 122 receives personal identifying information. Video annotation interface 122 submits the personal identifying information to video streaming program 132 for authentication. In an alternative embodiment, video streaming program 132 prompts a user, where video annotation interface 122 displays the login request on client device 120, of client device 120 to input login information associated with a social media account and submit the login information to video streaming program 132 for authentication.

In various embodiments, video annotation interface 122 operates to receive data content from database 134. Video annotation interface 122 retrieves data content which can include, but is not limited to, images, text, videos, annotation lists, or various other digital pictures from database 134, wherein, video annotation interface 122 populates the screen of client device 120 with data content. In another embodiment, video annotation interface 122 receives data from video streaming program 132. Upon video streaming program 132 authenticating client device 120 utilizing the personal identifying information as recognized above, video streaming program 132 retrieves data content from database 134.

In addition to the features of video annotation interface 122 as recognized above, video annotation interface 122 is a computer program designed to run on client device 120. An application frequently serves to provide a user with services accessed on computing devices (e.g., web browsers, playing music, video streaming, or other media, etc.). In one embodiment, a user utilizes video annotation interface 122 of client device 120 to access data content. For example, video annotation interface 122 is a web browser of a tablet that a user can utilize to access videos on a website. In another embodiment, a user utilizes video annotation interface 122 of client device 120 to access data content stored on database 134. For example, a user utilizes a web browser (e.g., video annotation interface 122) to view a video stream (e.g., video streaming program 132) stored on a server (e.g. database 134).

In this exemplary embodiment, video annotation interface 122 and video streaming program 132 are stored on database 134. However, in other embodiments, video annotation interface 122 and video streaming program 132 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between client device 120 and computing device 130, in accordance with a desired embodiment of the present invention.

In various embodiments of the present invention, computing device 130 is a computing device that can be a standalone device, a server, a laptop computer, a tablet computer, a netbook computer, a personal computer (PC), a personal digital assistant (PDA), a desktop computer, or any programmable electronic device or combination of programmable electronic devices capable of executing machine readable program instructions and communicating with client device 120, and other computing devices (not shown) within computing environment 100 via a network, such as network 110. In another embodiment, computing device 130 represents a computing system utilizing clustered computers and components to act as a single pool of seamless resources. In general, computing device 130 can be any computing device or a combination of devices with access to client device 120 and network 110 and is capable of executing video streaming program 132 and database 134. Computing device 130 may include internal and external hardware components, as depicted and described in further detail with respect to FIG. 1.

Video streaming program 132 is depicted in FIG. 1 for illustrative simplicity, however, computing device 130 can include any number of logics that are managed in accordance with video streaming program 132. In general, video streaming program represents a physical or virtual resource to which the entity or organization represented by computing device 130 wishes to manage access. In some embodiments, video streaming program 132 represents information and video annotation interface 122 manages the ability to view the information. In other embodiments, video streaming program 132 represents code that provides an ability to take specific action with respect to another physical or virtual resource and video annotation interface 122 manages the ability to take such actions. In yet other embodiments, video streaming program 132 represents control over a physical or virtual resource and video annotation interface 122 manages the ability to use and modify the resource. Video annotation interface 122 can also represent any combination of the aforementioned elements. To illustrate various aspects of the present invention, examples of video streaming program 132 are presented in which video streaming program 132 represents, but is not limited to, one or more of: a video stream, a hierarchy of additional content, or a user profile transaction. Embodiments of the present invention recognize that video streaming program 132 may include other forms of transactions that are known in the art.

In the embodiment depicted in FIG. 1, video streaming program 132 utilizes, at least in part, data stored on database 134 to manage video streams and generate a hierarchy of additional content, in response to video stream transaction requests received from client device 120 (i.e., from user of client device 120, alternatively referred to herein as a "requestor"). More specifically, video streaming program 132 defines a resource hierarchy that (i) represents various social media interests and that (ii) associates certain social media interests with certain user preferences associated with client device 120.

Video streaming program 132 retrieves data content corresponding to a user selection. As recognized above, video annotation interface 122 receives a user selection of data content and transmits this selection to video streaming program 132. Additionally, as recognized above, video streaming program 132 transmits the selected data content to video annotation interface 122 to display the data content on client device 120. In one embodiment, video streaming program 132 detects an entity identified with data content. For example, video streaming program 132 monitors a video stream stored on database 134, wherein the video stream was retrieved to display on a tablet computer (e.g., client device 120) to detect predefined entities, stored as metadata, associated with the video stream. Video streaming program 132 retrieves social media interests of the user of client device 120 and matches interests with entities identified with the video stream. In some embodiments, the interests and/or trend patterns identified by video streaming program 132 are referred to as user data. User data can include, but is not limited to, data content identified from a social media account of the user of client device 120. The present invention recognizes that user data can include, but is not limited to, the features recognized above and the features recognized below, as depicted in FIG. 1. For example, a user has a social media account (e.g., Twitter, Facebook, Instagram, etc.) and follows particular individuals, companies, and/or organizations (i.e., data content) on the relative social media account. Additionally, video streaming program 132 utilizes a natural language processor to analyze the content that a user posts on a social media account and generate a list of entities. In addition to the features recognized above, video streaming program 132 analyzes the data content (i.e., video, pictures, weblinks, like, retweet, etc.) a user "views" and analyzes the data content to generate a list of entities. Video streaming program 132 analyzes the content that a user follows and/or subscribes to these entities and identifies data (i.e., social media interests and/or trend patterns) relative to these entities to generate a hierarchy of additional content. Video streaming program 132 compiles a hierarchy of additional content based, at least in part, on the social media interests of the user of client device 120 and entities identified in the video stream. Video streaming program 132 transmits the hierarchy of additional content to client device 120, and client device 120 utilizes video annotation interface 122 to populate the video stream with a hierarchy of additional content. The user of client device 120 is presented with the hierarchy of additional content that is displayed concurrently with the video stream on the display screen of client device 120. The user of client device 120 interacts with the annotations of the hierarchy of additional content and selects an additional content to display concurrently with the video stream on the display screen of client device 120.

In some embodiments of the present invention, the video stream is displayed on a first portion of the display screen on client device 120, and the hierarchy of additional content is displayed on a second portion of the display screen on client device 120. In various embodiments, the video stream is displayed on the entire display screen of client device 120, and the hierarchy of additional content is overlaid on a second portion of the video stream and is displayed on client device 120. In other embodiments, the video stream is displayed on a first portion of the display screen of client device 120, and the hierarchy of additional content is displayed on a second portion of the display screen of client device 120, wherein, the second portion partially overlaps the first portion displayed on the display screen of client device 120. In another embodiment, the video stream is displayed on a first portion of the display screen of client device 120, and the hierarchy of additional content is displayed on a second portion of the display screen of client device 120, wherein, the second portion does not overlap the first portion displayed on the display screen of client device 120. In various embodiments of the present invention, the video stream is displayed as a viewport on the display screen of client device 120, and the hierarchy of additional content is displayed on a second portion within the viewport of client device 120.

In various embodiments, video streaming program 132 analyzes the metadata of video streams. Video streaming program 132 operates to analyze the metadata and identify entities, stored as metadata on the video streams. One having ordinary skill in the art can recognize that entities can be stored as metadata on the video streams. In additional embodiments, video streaming program 132 analyzes the data of a social media account of the user of client device 120. Video streaming program 132 operates to analyze the interests and/or trend patterns of the user's social media account. One having ordinary skill in the art can recognize, that data of a user's interests and trend patterns, associated with one or more social media accounts, can be analyzed using natural language processing, image detection, etc.

In some embodiments, video streaming program 132 identifies a plurality of entities from one or more video streams and generates a list of entities. Entities are word and/or phrase descriptions associated with the data content of the video stream. Video streaming program 132 stores the list of entities on database 134. In addition to the embodiments recognized above, video streaming program 132 analyzes the metadata of the video stream to generate, at least, a second list of entities and stores the, at least, second list of entities on database 134. Video streaming program 132 identifies interests and/or trend patterns from a user's social media account and generates a list of interests and/or trend patterns and stores this list of interests and/or trend patterns on database 134. In addition to the embodiments recognized above, video streaming program 132 analyzes the user's social media account to generate, at least, a second list of interests and/or trend patterns and stores the, at least, second list of interests and/or trend patterns on database 134.

In various embodiments, the present invention recognizes that entities stored as metadata are descriptions relating to one or more classification(s) of the video stream. Examples provided of entities are for illustrative purposes and are not limited herein. For example, the video stream is a televised golf tournament, wherein, entities used to describe the televised golf tournament can include, but are not limited to, golf accessories, golf clubs, golf course, athletes, etc. In some embodiments, the present invention recognizes that social media interests and/or trend patterns can be analyzed from the social media account of a user of client device 120. Examples provided of social media interests and/or trend patterns are for illustrative purposes and are not limited herein. For example, interests and/or trend patterns of the social media account of a user of client device 120 can include, but are not limited to, specific athletes, golf-brand company that manufactures golf accessories, etc.

Video streaming program 132 operates to create a hierarchy of additional content based, at least in part, on the features of entities and interests and/or trend patterns as recognized above. In various embodiments, video streaming program 132 retrieves the list of entities, identified by video streaming program 132, associated with a video stream from database 134. Additionally, video streaming program 132 retrieves the list of interests and/or trend patterns, identified by video streaming program 132 from the social media account of a user of client device 120, from database 134. Video streaming program 132 operates to correlate entities identified of the video stream with interests and/or trend patterns identified of the social media account of the user, and matches the entities with interests and/or trend patterns with a threshold based, at least in part, on the relevance of the entities and the interests and/or trend patterns.

Further, video streaming program 132 operates to compile the various entities and interests and/or trend patterns that have been matched, and searches the web, utilizing network 110, to identify various content to create a hierarchy of additional content to transmit to client device 120. For example, video streaming program 132, identifies based, at least in part, on the entities and interests and/or trend patterns, various content including, but not limited to, a video clip of an athlete playing golf from last year's tournament. Video streaming program 132 compiles the identified content and creates a hierarchy of additional content based, at least in part, on (i) the entities, (ii) the interests and/or trend patterns, and (iii) additional content identified from the web. Video streaming program 132 transmits the hierarchy of additional content to client device 120.

Client device 120 receives the hierarchy of additional content from video streaming program 132, and client device 120 utilizes video annotation interface 122 to display the hierarchy of additional content displayed concurrently with the video stream on the display screen of client device 120. Video annotation interface 122 operates to display the hierarchy of additional content on a portion of the display screen of client device 120. Additionally, video annotation interface 122 operates to generate hyperlinks to each of the various additional content displayed on the display screen of client device 120. One having ordinary skill in the art will understand that annotations displayed on the display screen of client device 120, can be interacted with by a user of client device 120. In some embodiments, a user of client device 120 interacts with annotations of the hierarchy of additional content displayed on the display screen of client device 120.

Video annotation interface 122 operates to monitor for user interactions with the annotations of the hierarchy of additional content on client device 120. Upon receiving a selection of additional content from a user interaction with client device 120, video annotation interface 122 operates to display the additional content in a portion of the display screen of client device 120, that is concurrently displaying the video stream that is displayed on the display screen of client device 120. Video annotation interface 122 transmits data based, at least in part, on the selection of additional content created by the user interaction with client device 120, to video streaming program 132. Video streaming program 132 operates to store the data collection from the user interaction of selecting additional content on database 134. In some embodiments, video streaming program 132 retrieves the data collection of selections made by user interactions and utilizes this data collection to identify additional content and generate a hierarchy of additional content. In another embodiment, video annotation interface 122 displays the video stream in a frame of client device 120. Additionally, video annotation interface 122 displays the hierarchy of additional content in a designated portion of the display screen of client device 120 (i.e., a picture-in-a-picture). The hierarchy of additional content is overlaid on the video stream being displayed on client device 120. In one embodiment, video annotation interface 122 monitors the frame of client device 120 for interaction with the hierarchy of additional content. For example, video annotation interface 122 uses pixel coordinates of where the annotation list is located in the frame of the video stream to determine whether a user interaction with the video is within the range of pixel coordinates that correspond with the hierarchy of additional content. In another example, video annotation interface 122 retrieves the data of the selection from the hierarchy of additional content (e.g., a photograph, presentation file, video, etc.) from database 134, and displays the data in a portion of the display screen of client device 120. In yet another example, video annotation interface 122 retrieves a link from database 134 where the link is a universal resource locator (URL) of a video (i.e. displayed additional content) shown in a portion of the display screen of client device 120.

In various embodiments depicted in FIG. 1, database 134 operates to store data for computing device 130 and client device 120. More specifically, database 136 stores (i) data content, (ii) video streams and (iii) personal identification information. To illustrate various aspects of the present invention, examples are presented in which one or a combination of a database and a computing device, are presented. However, embodiments are not limited thereto. In various embodiments, database 134 encompasses any computing resource, or combination of computing resources, that are configured to carry out streaming intelligence using the processes described herein. Embodiments of the present invention recognize that computing environment 100 may include other forms of computing devices that are known in the art.

In additional embodiments, computing environment 100 can include additional servers and/or databases (now shown) that host additional documents, images, and videos that are accessible to client device 120 via network 110. Video streaming program 132 identifies entities stored as metadata on data content (i.e., video stream) stored on database 134. For example, video streaming program 132 requests the corresponding data content (i.e., video streams), and transmits the data content to video annotation interface 122 to display in the frame of client device 120. Additionally, video streaming program 132 requests the corresponding data to compile a hierarchy of additional content and transmits the data to video annotation interface 122 to display the hierarchy of additional content on the display screen of client device 120.

Figure 2:
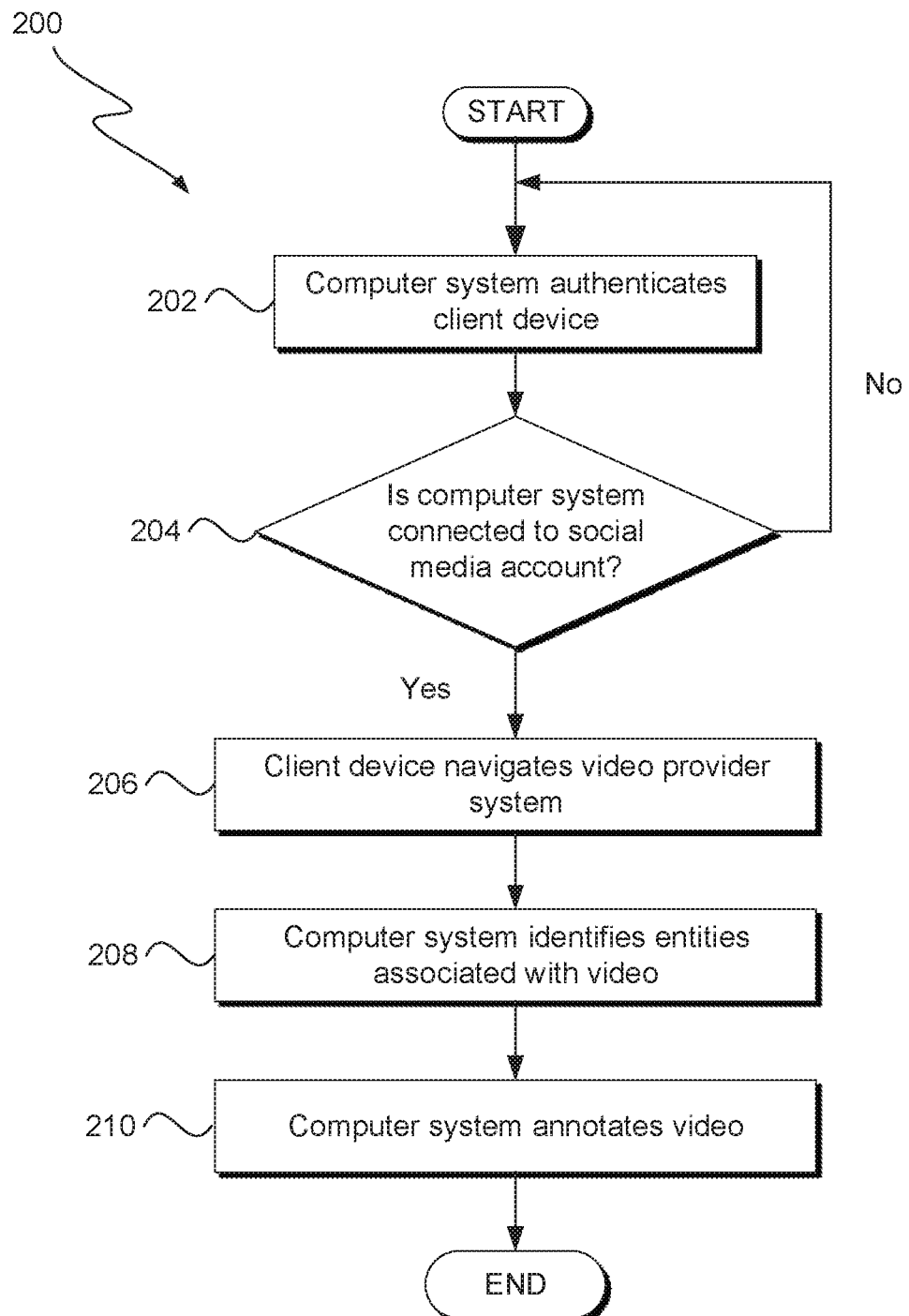
FIG. 2 illustrates operational processes of a video streaming program executing on a computing device within the environment of FIG. 1, in accordance with at least one embodiment of the present invention.

FIG. 2 is a flowchart depicting operations for executing a video annotating system for computing environment 100, in accordance with an illustrative embodiment of the present invention. More specifically, FIG. 2, depicts combined overall operations, 200, of video annotation interface 122 and video streaming program 132 executing on client device 120 and computing device 130, respectively, to manage video annotations to video streams based, at least in part, on personal social media accounts. In some embodiments, operations 200 represents logical operations of video streaming program 132, wherein video annotation interface 122 represents interactions between logical units executing on client device 120. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series of operations, in flowchart 200, can be terminated at any operation. In addition to the features previously mentioned, any operation, of flowchart 200, can be resumed at any time.

In one embodiment, responsive to receiving a request from a client device (i.e., from a user of client device 120; operation 202), computing device 130 operates to authenticate the user of client device 120 using personal identifying information stored on database 134 and transmit authentication for the user of a client device to client device 120. Embodiments of the present invention recognize that (i) there are a variety of alternate ways in which computing device 130 may be prompted to authenticate a user of client device 120 and (ii) that such variety is encompassed herein. In operation 202, client device 120 communicates data with computing device 130. In some embodiments, client device 120 communicates data with computing device 130 through network 110. In other embodiments, client device 120 can directly communicate data with computing device 130. In some embodiments, the request is based, at least in part, on the social media account stored on database 134.

In one embodiment, client device 120 requests access to a social media account with computing device 130. In another embodiment, computing device 130 presents client device 120 with a request. Responsive to receiving a request to perform social media access, computing device 130 authenticates the user of client device 120. In some embodiments, client device 120 requests access to a social media account with computing device 130 to authenticate a user login.

In one embodiment, computing device 130 represents one or more of: a video streaming service that receives a social media account login request from client device 120. For example, a social media account login request may represent a request to login to a social media account, update personal information (e.g., a user profile), or utilize another service of the video streaming service via a website application (i.e., an "app" on a mobile electronic device or other computational device(s)). In another embodiment, computing device 130 represents a social media institution and the account login request represents one or more of: a request to authorize an account transaction, update personal information (e.g., a user profile), or utilize another service of the social media institution via a website application (i.e., an "app" on a mobile electronic device or other computational device(s)). Embodiments recognize that a variety of computing devices with access to services and/or institutions recognize above, may provide availability to account login to clients and that a variety of requests may initiate the generation, authentication, access to and/or availability of data to a client.

If video streaming program 132 determines that client device 120 submitted login information (i.e., personal identifying information) corresponding to a social media account to authenticate the user of client device 120 (decision 204, YES branch), video streaming program 132 authenticates the user of client device 120 and approves client device 120 request to access video streaming service (i.e., video streaming program 132). If video streaming program 132 determines that client device 120 did not submit login information corresponding to a social media to authenticate the user of client device 120 (decision 204, NO branch), video streaming program 132 denies the request and notifies client device 120 of the operation. Additionally, video streaming program 132 transmits a notification to client device 120, that if video streaming program 132 is to communicate a hierarchy of additional content during a video stream, the user of client device 120 must submit login information associated with a social media account. If, for example, video streaming program 132 determines that the imputed login information cannot be validated against a social media account stored on database 134, then the video streaming program 132 denies the commercial transaction request and client device 120 submits another request.

In operation 206, client device 120 navigates video streaming provider's service to select a video stream to populate on client device 120. In one embodiment, client device 120 has been authenticated by video streaming program 132 and client device 120 requests webpage data (e.g., video stream provider's webpage) stored on database 134 to select a video stream to populate on client device 120. In another embodiment, client device 120 selects a video stream to populate on client device 120 and video streaming program 132 transmits the video stream data to client device 120, and client device 120 utilizes video annotation interface 122 to populate the video stream on the device. One of ordinary skill in the art, and embodiments of the present invention, recognize that populating a video stream on client device 120 refers to a user of client device 120 "viewing" the video stream on the display of client device 120.

In operation 208, video streaming program 132 analyzes the metadata of a video stream, selected by the user of client device 120, to identify entities associated with the video stream. In one embodiment, the video streaming service that provides the video stream creates the entities and stores the entities as metadata on the video stream. In one example, the video streaming service associates a video stream about golf with entities including, but not limited to: golf clubs, specific athletes, companies associated with golf, etc., and stores the entities as metadata on the video stream.

In various embodiments, video streaming program 132 analyzes a video stream and identifies entities stored as metadata on the video stream. Additionally, video streaming program 132 analyzes the social media account of the user of client device 120 and correlates the social media account interests identified on the social media account with entities identified as metadata on the video stream selected by client device 120. Video streaming program 132 matches the social media interests with the entities of the video stream, and video streaming program 132 compiles a hierarchy of additional content based, at least in part, on the amount of data collected from the social media account of the user of client device 120. The hierarchy of additional content contains a plurality of data content that is transmitted by video streaming program 132 to client device 120. Client device 120 utilizes video annotation interface 122 to populate the hierarchy of additional content onto a portion of the display screen of client device 120 and monitor the frame of client device 120 for user interactions (operation 210).

In operation 210, client device 120 monitors the device to detect interactions with the frame, relating to selections of the hierarchy of additional content. Video annotation interface 122 records the selection made the user of client device 120 and stores the user preference as data on database 134. In another embodiment, video annotation interface 122 records the user preference and transmits the data to video streaming program 132 that analyzes and stores the data on database 134. Video streaming program 132 utilizes the data to modify the first hierarchy of additional content and generate, at least, a second hierarchy of additional content more closely related to the social media interests of the user of client device 120.

Figure 3:
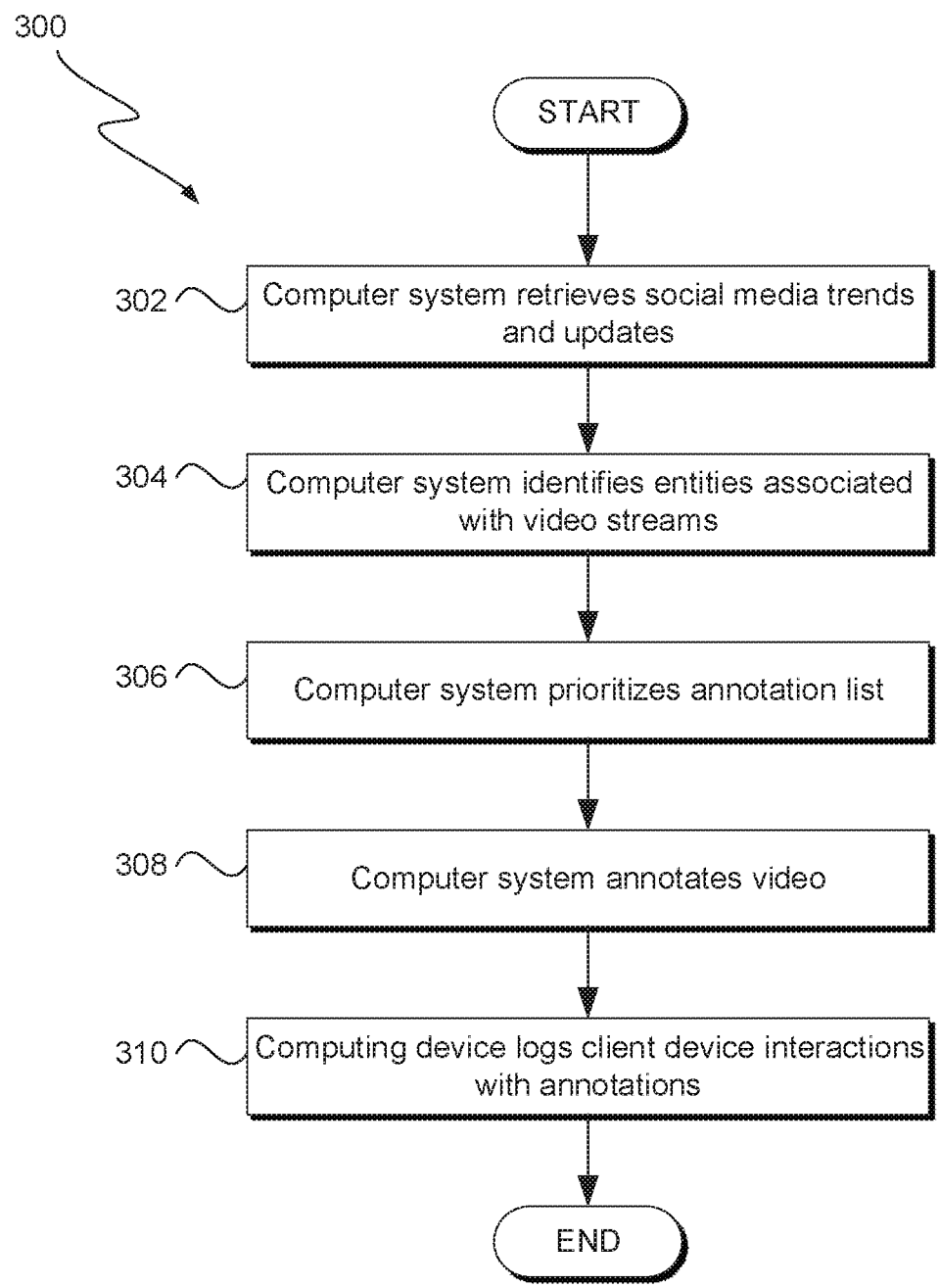
FIG. 3 illustrates operational processes of the video streaming program executing operations to generate a hierarchy of additional content within the environment of FIG. 1, in accordance with at least one embodiment of the present invention.

FIG. 3 is a flowchart depicting operations for executing operations to identify entities of a video stream, generate a hierarchy of additional content based, at least in part, on a user's social media account which computing environment 100 has access to, and populate the video stream with the hierarchy of additional content within the computing environment 100 depicted in FIG. 1, in accordance with an embodiment of the present invention.

Operations 300 represents logical operations of video streaming program 132 that interact and influence operations of 200 of video annotation interface 122 of client device 120. Video annotation interface 122 represents interactions between logical units executing on client device 120, as depicted in FIG. 2. In some embodiments, operations 300 can include one or more elements of operations 200, in which case, interactions between operations 200 and 300 represent logic of video annotation interface 122 and video streaming program 132.

When video streaming program 132 receives a social media account login request from a user of client device 120 and streaming program 132 authenticates client device 120, video streaming program 132 analyzes interests and trend patterns of the social media account of the user of client device 120 (operation 302). In some embodiments, video streaming program 132 extracts data from the social media account(s) and stores the data on database 134. Video streaming program 132 analyzes the data extracted from the social media account, and generates a hierarchy based, at least in part, on the amount of data collected for each specific interest and/or trend pattern. Video streaming program 132 executes logic to create a hierarchy of the data and assigned a tier value to the data and stores the hierarchy on database 134.

In operation 304, video streaming program 132 retrieves data associated with a video stream from database 134. In various embodiments, video streaming program 132 retrieves data of the video stream selected by the user of client device 120. In some embodiments, video streaming program 132 continuously retrieves data from various video streams stored on database 134. Upon retrieving the data, video streaming program 132 analyzes the metadata of the video stream and identifies a plurality of entities associated with the video stream. Video streaming program 132 stores the analyzed metadata on database 134.

In various embodiments, video streaming program 132 retrieves the data associated with the social media interests and trend patterns, and video streaming program 132 retrieves the data associated with the entities of the video stream from database 134 (operation 306). In some embodiments, the data of the social media interests and trend patterns and/or data of the entities of the video stream are stored on computing devices not shown in computing environment 100. Additionally, video streaming program 132 communicates with computing devices not show in computing environment 100 and retrieves the data, respectively, as recognized above. Video streaming program 132 operates to correlate data of the entities identified in the video stream with data obtained from the social media interests and trend patterns. Further, video streaming program 132 matches the entity data and the social media interests and trend pattern data and creates a hierarchy of data associated with the entities and social media interests and trend patterns. In various embodiments, video streaming program 132 executes logic to create a hierarchy of additional content on the data recognized above and assigns a tier value to the data content based, at least in part, on the relevance of the data content matched with the entities of the video stream and the social media interests and trend patterns. In some embodiments, video streaming program 132 assigns a tier value to the data content that is identified. Video streaming program 132 operates to assign a tier value based, at least in part, on the amount data collected for a particular data content. For example, video streaming program 132 identifies that a user has created data content one-hundred and twenty times regarding a particular golf-brand company and one-hundred times regarding a particular golf athlete. Video streaming program 132 will assign a higher tier value to the data content regarding the golf-brand company and a lower tier value to data content regarding the gold athlete.

In operation 308, video streaming program 132 communicates the hierarchy of additional content to client device 120. Client device 120 utilizes video annotation interface 122 to display the data hierarchy of additional content concurrently with the video stream that is displayed on the display screen of client device 120. One skilled in the art would recognize that to display the hierarchy of the additional content in the frame of the video stream means to display the data of the hierarchy of additional content on a portion of the display screen that is concurrently displaying the video stream on a computing device, and can be accessed by a user of client device 120, through interactions with the detected by video annotation interface 122.

In operation 310, video annotation interface 122 records data associated with interactions made to the hierarchy of additional content, displayed on the display screen of client device 120, that is concurrently displaying the video stream displayed on the display screen of client device 120. Video annotation interface 122 communicates this interaction data to computing device 130, where computing device 130 utilizes video streaming program 132 to analyze the data received from video annotation interface 122. Video streaming program 132 detects user preferences based, at least in part, on the selection of data content from the interactions made to the hierarchy of additional content and records the user preferences on database 134. In some embodiments, video streaming program 132 retrieves the interaction data associated with user preferences from database 134, and utilizes the interaction data while analyzing the data of the entities of the video stream and data of the social media interests and trend patterns to create, at least, a second hierarchy of additional content, for at least, a second video stream selected by the user of client device 120.

Figure 4:
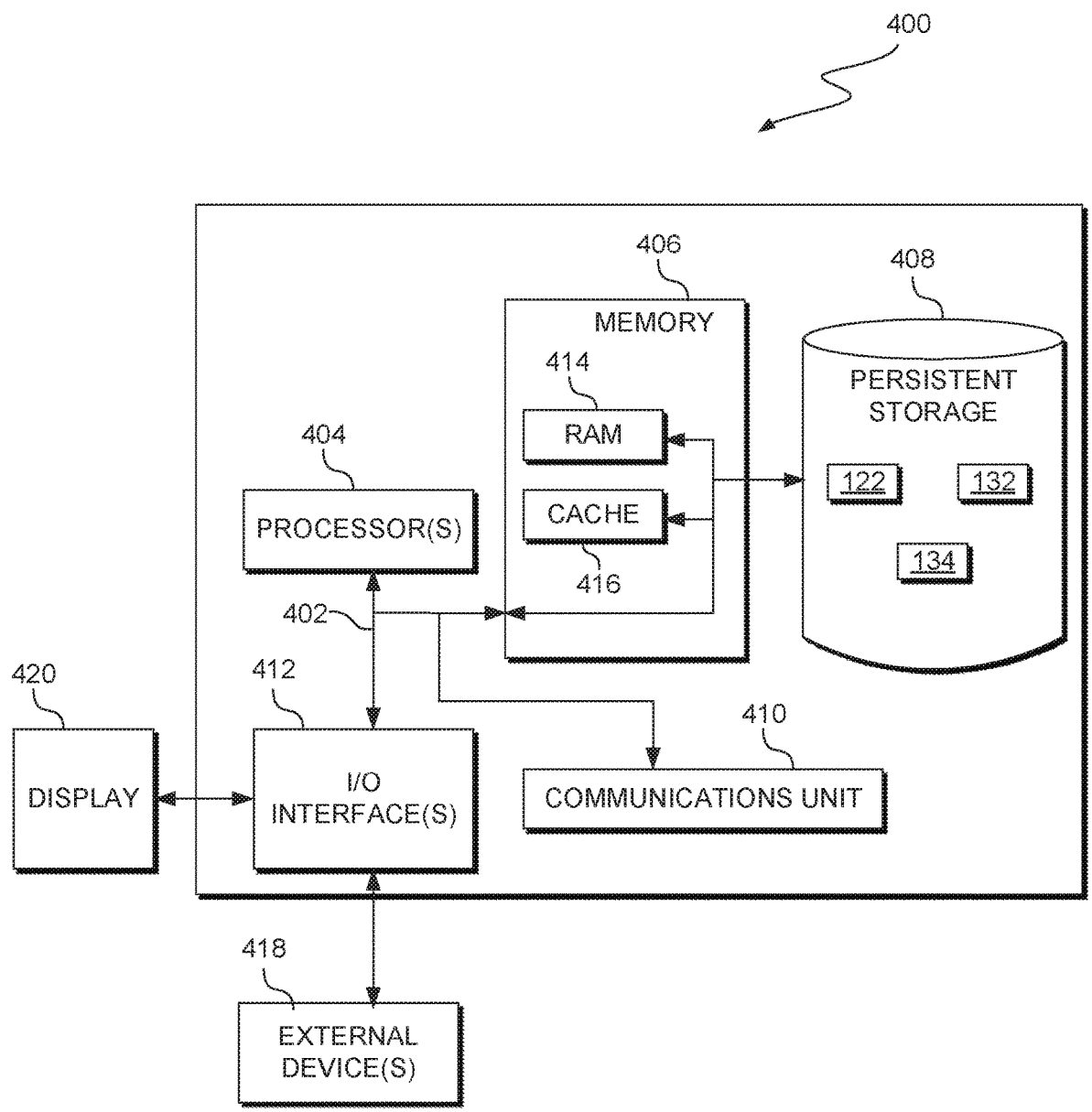
FIG. 4 is a block diagram of components of one or more computing devices within the computing environment depicted in FIG. 1, in accordance with at least one embodiment of the present invention.

FIG. 4 depicts a block diagram, 400, of components of computing environment 100, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing environment 100 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Video annotation interface 122, video streaming program 132, and database 134 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage X08.

Communications unit 410, in these examples, provides for communications with other data processing systems or devices, including resources of network 110. In these examples, communications unit 410 includes one or more network interface cards. Communications unit 410 may provide communications through the use of either or both physical and wireless communications links. Video annotation interface 122, video streaming program 132, and database 134 may be downloaded to persistent storage 408 through communications unit 410.

I/O interface(s) 412 allows for input and output of data with other devices that may be connected to computing environment 100. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., video annotation interface 122, video streaming program 132, and database 134, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method for executing a customized video stream system, the method comprising:
   determining, by one or more processors, a first content is selected on a user device;
   populating, by one or more processors, a video stream on the user device based, at least in part, on a selection of the first content;
   analyzing, by one or more processors, (i) at least one video stream that includes a set of entities and (ii) a social media account associated with a user of the user device;
   identifying, by one or more processors, (i) a plurality of entities associated with the, at least, one video stream and (ii) a plurality of user data associated with the social media account;
   searching, by one or more processors, for a second content that includes based, at least in part, on (i) the plurality of entities associated with the, at least, one video stream and (ii) a plurality of user data associated with the social media account;
   generating, by one or more processors, a hierarchy of additional content based, at least in part, on the second content that is associated with (i) the plurality of entities and (ii) the user data associated with the social media account,
   wherein the hierarchy of additional content contains a plurality of second content;
   generating, by one or more processors, a customized video stream based, at least in part on (i) the video stream and (ii) the hierarchy of additional content; and
   populating, by one or more processors, the customized video stream on a display screen of the user device,
   wherein the video stream is displayed on the display screen of the user device, and the hierarchy of additional content is displayed in a portion of the display screen and displayed concurrently with the video stream.

2. The method of claim 1, the method further comprising:
   analyzing, by the one or more processors, a first social media account;
   identifying, by the one or more processors, user data associated with the first social media account;
   generating, by the one or more processors, a data record that is based, at least in part, on the user data identified on the first social media account; and
   storing, by the one or more processors, a data record that is based, at least in part, on the user data on a database.

3. The method of claim 1, the method further comprising:
   analyzing, by the one or more processors, the, at least, one video stream, populated, on the user device;
   identifying, by the one or more processors, a plurality of entities associated (i) with the, at least, one video stream and (ii) data stored on a database; and
   storing, by the one or more processors, the plurality of entities on the database.

4. The method of claim 1, the method further comprising:
   responsive to (i) generating the data record that is associated with the plurality of user data of the social media account and (ii) identifying the plurality of entities associated with the, at least, one video stream, generating, by the one or more processors, the hierarchy of additional content;
   wherein, the hierarchy of additional content is associated with (i) the plurality of entities, (ii) the data record, and (iii) a user of the user device.

5. The method of claim 4, the method further comprising:
   populating, by the one or more processors, the user device based, at least in part, on the hierarchy of additional content.

6. The method of claim 1, the method further comprising:
   monitoring, by the one or more processors, a display screen of the user device for interactions with the hierarchy of additional content displayed in the display screen of the user device.

7. The method of claim 1, the method further comprising:
   detecting, by the one or more processors, interactions on the display screen of the user device based, at least in part, on the hierarchy of additional content; and
   storing, by the one or more processors, a data collection of the interactions on the display screen of the user device based, at least in part, on the hierarchy of additional content.

8. A computer program product for executing a customized video stream system, the computer program product comprising a computer readable storage medium having program instructions embodied therewith, the program instructions readable by one or more processors to cause the one or more processors to execute a computer-implemented method comprising:
   determining, by the one or more processors, a first content is selected on a user device;
   populating, by the one or more processors, a video stream on the user device based, at least in part, on a selection of the first content;

analyzing, by the one or more processors, (i) at least one video stream that includes a set of entities and (ii) a social media account associated with a user of the user device;

identifying, by the one or more processors, (i) a plurality of entities associated with the, at least, one video stream and (ii) a plurality of user data associated with the social media account;

searching, by the one or more processors, for a second content that includes based, at least in part, on (i) the plurality of entities associated with the, at least, one video stream and (ii) a plurality of user data associated with the social media account;

generating, by the one or more processors, a hierarchy of additional content based, at least in part, on the second content that is associated with (i) the plurality of entities and (ii) the user data associated with the social media account,
  wherein the hierarchy of additional content contains a plurality of second content;

generating, by the one or more processors, a customized video stream based, at least in part on (i) the video stream and (ii) the hierarchy of additional content; and populating, by the one or more processors, the customized video stream on a display screen of the user device,
  wherein the video stream is displayed on the display screen of the user device, and the hierarchy of additional content is displayed in a portion of the display screen and displayed concurrently with the video stream.

9. The computer program product of claim 8, the program instructions further comprising:
  analyzing, by the one or more processors, a first social media account;
  identifying, by the one or more processors, user data associated with the first social media account;
  generating, by the one or more processors, a data record that is based, at least in part, on the user data identified on the first social media account; and
  storing, by the one or more processors a data record that is based, at least in part, on the user data on a database.

10. The computer program product of claim 8, the program instructions further comprising:
  analyzing, by the one or more processors, the, at least, one video stream, populated, on the user device;
  identifying, by the one or more processors, a plurality of entities associated (i) with the, at least, one video stream and (ii) data stored on a database; and
  storing, by the one or more processors, the plurality of entities on the database.

11. The computer program product of claim 8, the program instructions further comprising:
  in response to (i) generating the data record that is associated with the plurality of user data of the social media account and (ii) identifying the plurality of entities associated with the, at least, one video stream, generating, by the one or more processors, the hierarchy of additional content,
    wherein, the hierarchy of additional content is associated with (i) the plurality of entities, (ii) the data record, and (iii) a user of the user device.

12. The computer program product of claim 11, the program instructions further comprising:
  populating, by the one or more processors, the user device based, at least in part, on the hierarchy of additional content.

13. The computer program product of claim 8, the program instructions comprising:
  monitoring, by the one or more processors, a display screen of the user device for interactions with the hierarchy of additional content displayed in the display screen of the user device.

14. The computer program product of claim 8, the computer program product comprising program instructions readable by one or more processors to cause the one or more processors to:
  detecting, by the one or more processors, interactions on the display screen of the user device based, at least in part, on the hierarchy of additional content; and
  storing, by the one or more processors, a data collection of the interactions on the display screen of the user device based, at least in part, on the hierarchy of additional content.

15. A computer system for a customized video stream system, the computer system comprising:
  one or more computer processors;
  one or more computer readable storage medium; and
  program instructions stored on the computer readable storage medium for execution by at least one of the one or more processors, the program instructions comprising:
    program instructions to determine a first content is selected on a user device;
    program instructions to populate a video stream on the user device based, at least in part, on a selection of the first content;
    program instructions to analyze (i) at least one video stream that includes a set of entities and (ii) a social media account associated with a user of the user device;
    program instructions to identify (i) a plurality of entities associated with the, at least, one video stream and (ii) a plurality of user data associated with the social media account;
    program instructions to search for a second content that includes based, at least in part, on (i) the plurality of entities associated with the, at least, one video stream and (ii) a plurality of user data associated with the social media account;
    program instructions to generate a hierarchy of additional content based, at least in part, on the second content that is associated with (i) the plurality of entities and (ii) the user data associated with the social media account,
      wherein, the hierarchy of additional content contains a plurality of second content;
    program instructions to generate a customized video stream based, at least in part on (i) the video stream and (ii) the hierarchy of additional content; and
    program instructions to populate the customized video stream on a display screen of the user device,
    wherein the video stream is displayed on the display screen of the user device, and the hierarchy of additional content is displayed in a portion of the display screen and displayed concurrently with the video stream.

16. The computer system of claim 15, the program instructions further comprising:
  program instructions to analyze a first social media account;
  program instructions to identify user data associated with the first social media account;

program instructions generate a data record that is based, at least in part, on the user data identified on the first social media account; and program instructions to store a data record that is based, at least in part, on the user data on a database.

17. The computer system of claim 15, the program instructions further comprising:

program instructions to analyze the, at least, one video stream, populated, on the user device;

program instructions to identify a plurality of entities associated (i) with the, at least, one video stream and (ii) data stored on a database; and program instructions to store the plurality of entities on the database.

18. The computer system of claim 15, the program instructions further comprising:

program instructions to respond to (i) generating the data record that is associated with the plurality of user data of the social media account and (ii) identifying the plurality of entities associated with the, at least, one video stream, generating, by the one or more processors, the hierarchy of additional content, wherein, the hierarchy of additional content is associated with (i) the plurality of entities, (ii) the data record, and (iii) a user of the user device.

19. The computer system of claim 18, the program instructions further comprising:

program instructions to populate the user device based, at least in part, on the hierarchy of additional content.

20. The computer system of claim 15, the program instructions further comprising:

program instructions to monitor a display screen of the user device for interactions with the hierarchy of additional content displayed in the display screen of the user device;

program instructions to detect interactions on the display screen of the user device based, at least in part, on the hierarchy of additional content; and program instructions to store a data collection of the interactions on the display screen of the user device based, at least in part, on the hierarchy of additional content.

* * * * *